No. 644,059. Patented Feb. 27, 1900.
J. M. CHEVRETON & S. RIVIÈRE.
GRAFTING MACHINE.
(Application filed Dec. 27, 1898.)
(No Model.) 2 Sheets—Sheet 1.
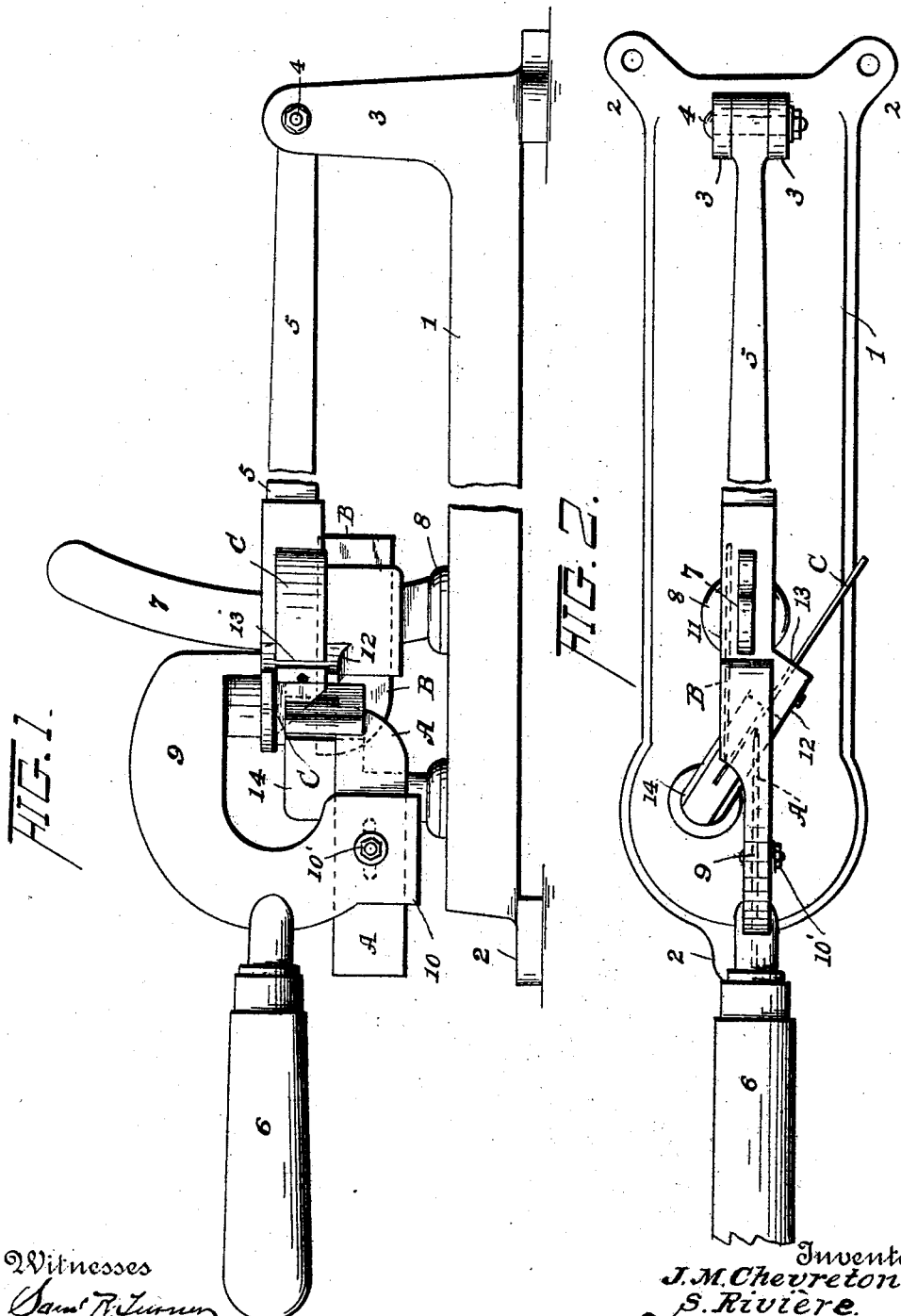
Witnesses
Sam¹ R. Turner
M. M. Phelps
Inventors
J. M. Chevreton.
S. Rivière.
by Frederick Benjamin,
Attorney No. 644,059. Patented Feb. 27, 1900.
J. M. CHEVRETON & S. RIVIÈRE.
GRAFTING MACHINE.
(Application filed Dec. 27, 1898.)

(No Model.) 2 Sheets—Sheet 2.

Witnesses
Sam'l R. Turner
M. M. Phelps.

Inventors
J. M. Chevreton.
S. Rivière.
by Frederick Benjamin
Attorney

UNITED STATES PATENT OFFICE.

JEAN MARIE CHEVRETON AND STÉPHANE RIVIÈRE, OF ST. CHAMOND, FRANCE.

GRAFTING-MACHINE.

SPECIFICATION forming part of Letters Patent No. 644,059, dated February 27, 1900.

Application filed December 27, 1898. Serial No. 700,453. (No model.)

*To all whom it may concern:*

Be it known that we, JEAN MARIE CHEVRETON and STÉPHANE RIVIÈRE, citizens of the Republic of France, residing at St. Chamond, Loire, France, have invented certain new and useful Improvements in Grafting Implements, of which the following is a specification.

The present invention has reference to horticultural implements; and the special object thereof is to provide a simple but substantial device especially constructed and adapted for grafting and like purposes and allowing the gardener and even those who are not skilled in the art to cut away the branches to be grafted very easily and readily and by one operation only.

The grafting appliance consists in a simple lever pivoted to a base or its equivalent and carrying three knives adapted to cut the necessary incisions in the twigs or branches to be grafted by a simple depression of the lever of the device, the same having been previously raised and the twig placed upon a suitable support provided on the device.

Our improvements consist in the arrangement and combination of parts more clearly and fully pointed out and claimed hereinafter and illustrated in the accompanying drawings, in which—

Figure 4:
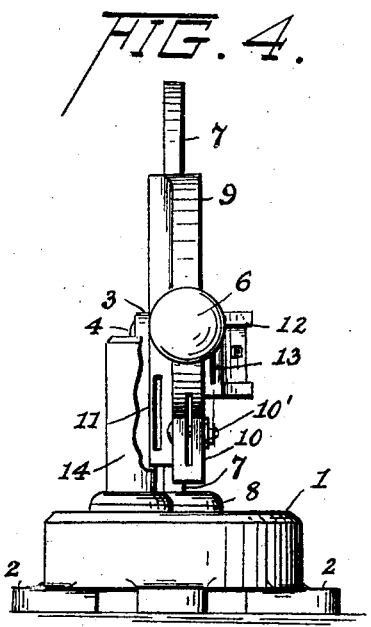
Figure 3:
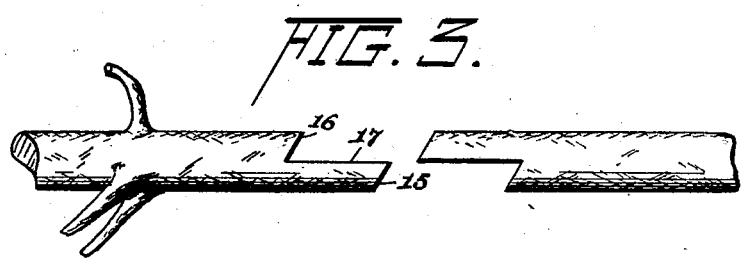
Figure 5:

Figure 1 is a side elevation of the improved implement embodying our invention. Fig. 2 is a plan view of the same, and Fig. 3 shows twigs or branches with the incisions for grafting as effected by my invention.

The letters A, B, and C represent, respectively, three knives, which are indicated in side elevation by partly-dotted lines in Fig. 1. These knives are fitted, in a manner to be described, to my implement, which comprises an oblong base 1, provided with suitable foot-pieces 2, by which it may be secured to a table, board, or the like, said base being preferably made of cast-iron. The base has an extension or vertical standard 3 at the rear end thereof, which is secured to or made a part of the base, and to the upper end of the standard is pivoted, by a pin 4, a lever 5. To the opposite end of the lever is secured a handle 6. To guide the vertical movement of the lever, we provide a post 7, having flat faces parallel to the axis of the lever, said post being secured at 8 to the base of the machine and extending through a suitable slot in the lever. The portion of the lever indicated by the numeral 9, between the slotted portion and the handle 6, has an upwardly-curved or arch shape. On the end of the arch toward the handle is carried the knife A, which is fitted into a slot and adjustably held therein by a pin 10' or may be secured in any other suitable manner. At one side of the lever, near the slotted portion, is a downward extension 11, which has a slot in its lower face in which there is a second knife B, the same being adjustably held in said slot by frictional contact with the sides of the slot or in any suitable manner. The knives A and B are arranged in lines parallel to each other and to the longitudinal axis of the lever and are adjustable longitudinally in their respective slots. On the side of the lever opposite the extension 11 there is another extension 12, provided with a slot or groove 13, in which is secured a third knife C, adjustably held therein in any suitable manner, said extension and slot being placed obliquely with respect to the knives A and B—that is, the longitudinal axis of the machine or lever.

From the drawings it will be seen that the knives A, B, and C are situated in three different horizontal planes for the purpose which will be described.

The machine is further provided with a support 14, secured to the base 1 in a position obliquely to the longitudinal axis of the machine, said support being adapted to receive and hold in position the twig, root, or branch to be cut for grafting.

The operation of the machine is as follows: The lever 5 is raised to the top of the curved pest 7, and the twig *a* to be grafted then laid upon the support 14 in line therewith. The operator depresses the lever, causing the knife A, which is nearest the base, to cut the twig on the line 15 to one-half of the cross-diameter of the twig. The second knife B then makes the cut 16 a little farther along on the twig and parallel with cut 15 to the center of the twig, and, finally, the third knife C cuts the twig on line 17, which is longitudinal to its axis, said cut extending to the cuts 15 and 16, and thus completely severing the twig, as shown in Fig. 3. It is obvious that a second twig cut in a similar manner will be easily grafted to any other twig having the same cuts.

Having fully described our invention, what we claim, and desire to secure by Letters Patent, is—

A grafting device consisting of a suitable base having a standard thereon, a lever pivoted to said standard and provided with slots parallel to the axis of the lever and one slot formed obliquely to its axis, a guide for said lever, knives secured in the aforesaid slots, and means for supporting the twigs to be operated upon, under said knives, substantially as set forth.

In testimony whereof we affix our signatures in presence of two witnesses.

CHEVRETON, JEAN MARIE.
   STÉPHANE RIVIÈRE.

Witnesses:
 JAMES CHAMBOVE,
 HALSINGS LEMOUGHY.